(12) United States Patent
Rodriguez et al.

(10) Patent No.: US 10,326,736 B2
(45) Date of Patent: Jun. 18, 2019

(54) FEATURE-BASED CLASSIFICATION OF INDIVIDUAL DOMAIN QUERIES

(71) Applicant: Cisco Technology, Inc., San Jose, CA (US)

(72) Inventors: David Brandon Rodriguez, Berkeley, CA (US); Jeremiah O'Connor, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 15/341,339

(22) Filed: Nov. 2, 2016

(65) Prior Publication Data
US 2018/0124020 A1     May 3, 2018

(51) Int. Cl.
*H04L 29/06* (2006.01)
*G06N 99/00* (2019.01)
*H04L 29/12* (2006.01)

(52) U.S. Cl.
CPC ....... *H04L 63/0281* (2013.01); *G06N 99/005* (2013.01); *H04L 61/1511* (2013.01); *H04L 61/3025* (2013.01); *H04L 63/0227* (2013.01); *H04L 63/101* (2013.01); *H04L 63/1425* (2013.01); *H04L 63/1441* (2013.01); *H04L 63/1458* (2013.01); *H04L 2463/144* (2013.01)

(58) Field of Classification Search
CPC . H04L 63/14; H04L 63/1408; H04L 63/0281; H04L 63/101; H04L 63/1425; H04L 63/1441; G06N 99/005
USPC ............................................. 726/12, 22–25
See application file for complete search history.

(56) References Cited

U.S. PATENT DOCUMENTS

| | | | |
|---|---|---|---|
| 8,516,585 B2 * | 8/2013 | Cao ..................... | H04L 63/1441 713/187 |
| 8,813,228 B2 * | 8/2014 | Magee .................. | G06F 21/577 713/187 |

(Continued)

FOREIGN PATENT DOCUMENTS

| CN | 105577660 A | 5/2016 |
|---|---|---|
| WO | WO-2012065521 A1 | 5/2012 |

OTHER PUBLICATIONS

Haddadi et al., "Malicious Automatically Generated Domain Name Detection Using Stateful-SBB", EvoApplications 2013, LNCS 7835, pp. 529-539, 2013, Springer-Verlag Berlin Heidelberg.

(Continued)

*Primary Examiner* — Hosuk Song
(74) *Attorney, Agent, or Firm* — Behmke Innovation Group LLC; James Behmke; Stephen D. LeBarron

(57) ABSTRACT

In one embodiment, a device in a network determines a first set of domain generation algorithm (DGA) predictions for a particular domain name by analyzing one or more extracted lexical features of the particular domain name using a first ensemble of decision trees. The device determines a second set of DGA predictions for the particular domain name by analyzing one or more extracted cluster features of a cluster of related domain names to which the particular domain name belongs using a second ensemble of decision trees. The device predicts a DGA associated with the particular domain name based on the first and second sets of DGA predictions. The device causes performance of a security action based on the predicted DGA associated with the particular domain.

20 Claims, 8 Drawing Sheets

(56) References Cited

U.S. PATENT DOCUMENTS

| | | | | |
|---|---|---|---|---|
| 9,306,969 B2* | 4/2016 | Dagon | .............. | H04L 29/12066 |
| 9,794,229 B2* | 10/2017 | Yu | ....................... | H04L 63/1425 |
| 9,917,852 B1* | 3/2018 | Xu | ..................... | H04L 63/1416 |
| 2013/0191915 A1 | 7/2013 | Antonakakis et al. | | |
| 2015/0264070 A1 | 9/2015 | Harlacher et al. | | |
| 2016/0057165 A1 | 2/2016 | Thakar et al. | | |

OTHER PUBLICATIONS

Yadav et al., "Detecting algorithmically generated malicious domain names", Proceedings of the 10th ACM SIGCOMM conference on Internet measurement (IMC '10), 14 pages, 2010, ACM.

* cited by examiner

FEATURE-BASED CLASSIFICATION OF INDIVIDUAL DOMAIN QUERIES

TECHNICAL FIELD

The present disclosure relates generally to computer networks, and, more particularly, to feature-based classification of individual domains.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network determines a first set of domain generation algorithm (DGA) predictions for a particular domain name by analyzing one or more extracted lexical features of the particular domain name using a first ensemble of decision trees. The device determines a second set of DGA predictions for the particular domain name by analyzing one or more extracted cluster features of a cluster of related domain names to which the particular domain name belongs using a second ensemble of decision trees. The device predicts a DGA associated with the particular domain name based on the first and second sets of DGA predictions. The device causes performance of a security action based on the predicted DGA associated with the particular domain.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
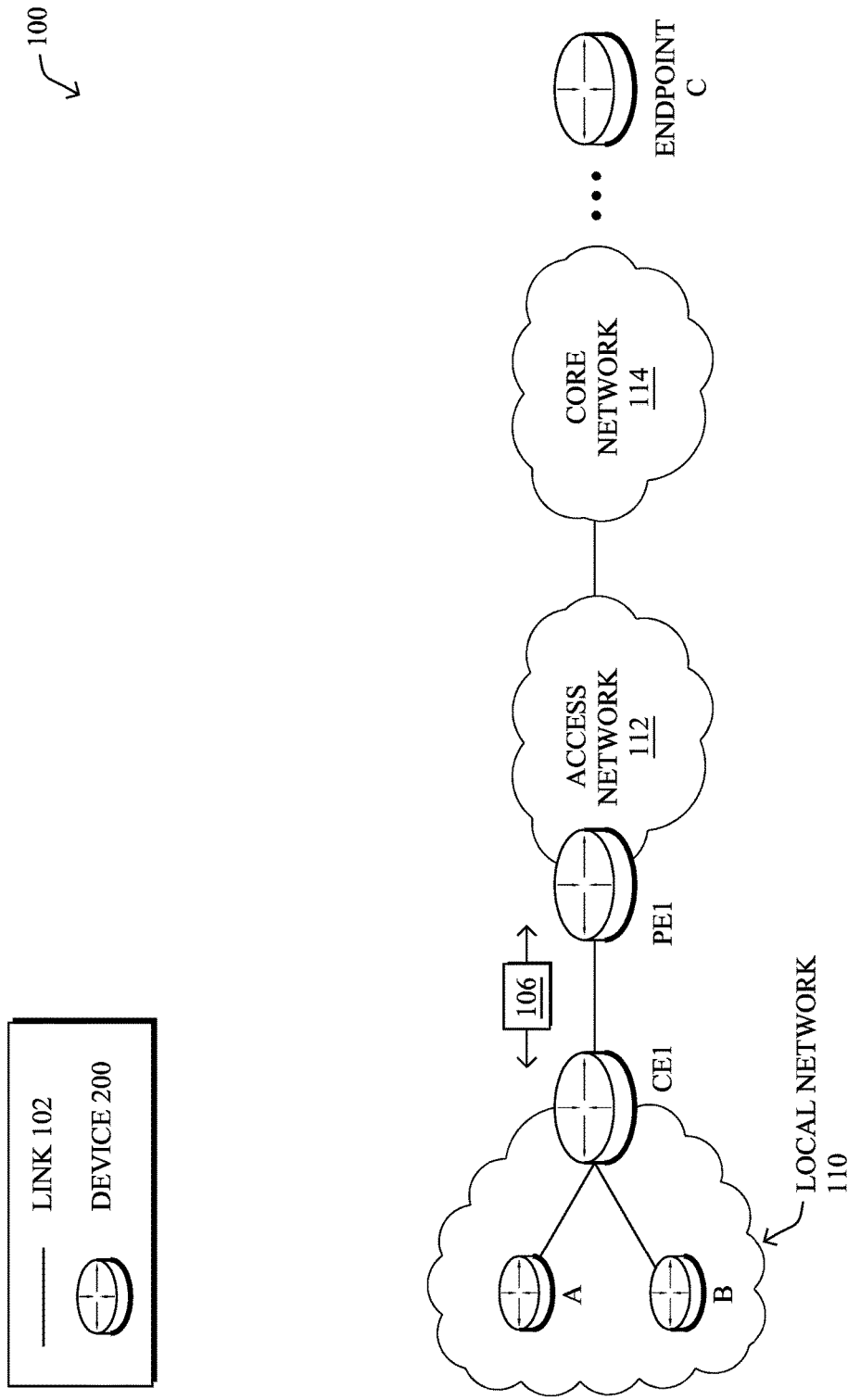
FIG. 1 illustrate an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
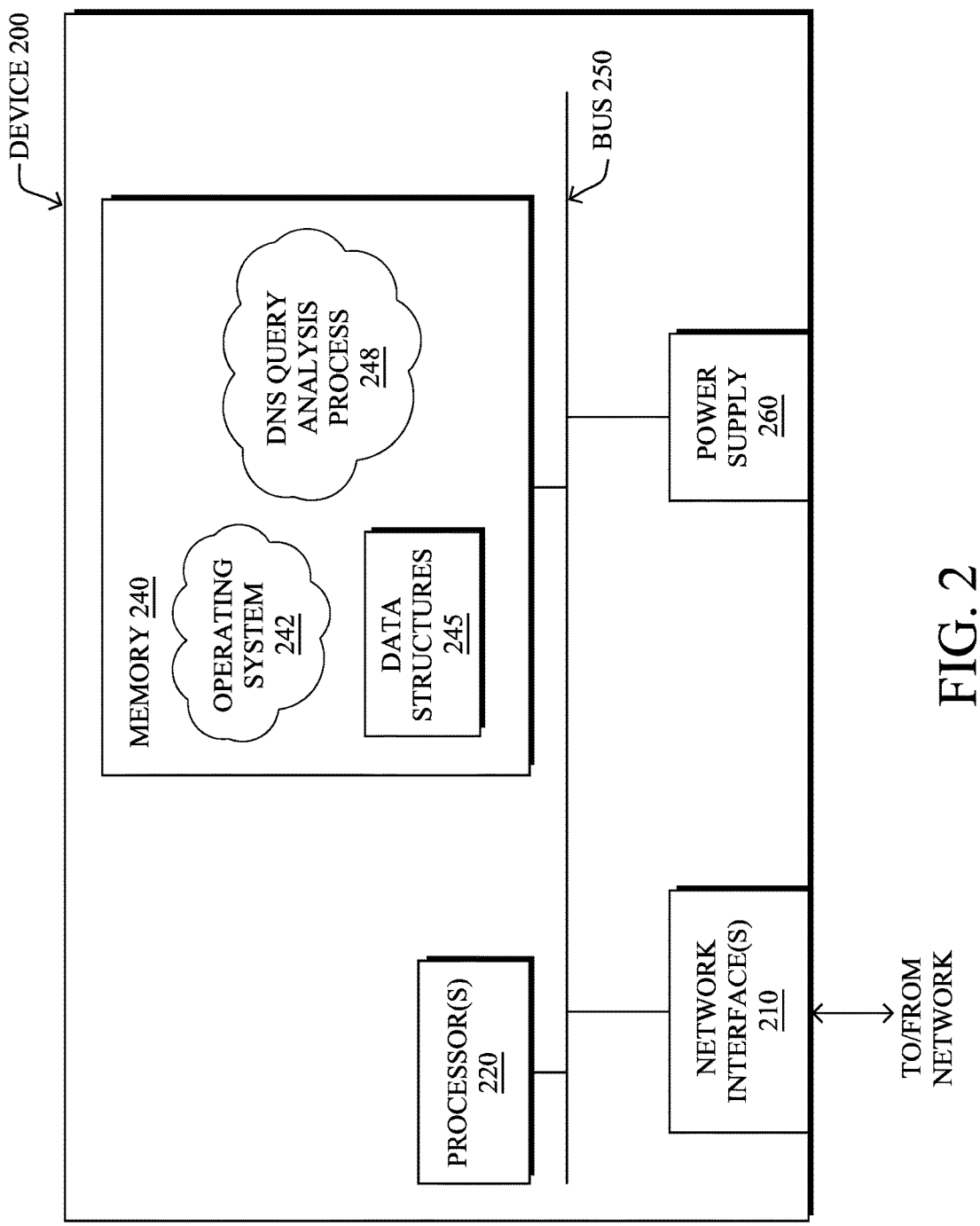
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a DNS query analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, botnets represent a security concern for network administrators. Once a client device has been infected with malware for the botnet, it may communicate with a command and control (C&C) server which sends control commands to the infected device. If the address of the C&C server is hardcoded into the malware itself, preventing operation of the botnet becomes a trivial task. Notably, all an administrator would need to do is block the address of the C&C server, to defeat control over the infected client device. However, many modern forms of malware do not use hardcoded addresses, but instead rely on domain generation algorithms (DGAs), to elude detection. Similar mechanisms are also used by other forms of malware, such as those that exfiltrate data from a network and the like.

In general, a DGA is a mechanism that generates a set of domain names based on some criteria, such as the time of day, month, year, etc. For example, a DGA may generate the domain names {a.com, b.com, a.b.com, . . . } on one day and the domains {bc.com, b.info, . . . } on the next day. In turn, the infected client device may perform a lookup of some or all of the generated domain names, to obtain the IP address of the C&C server.

Figure 3A:
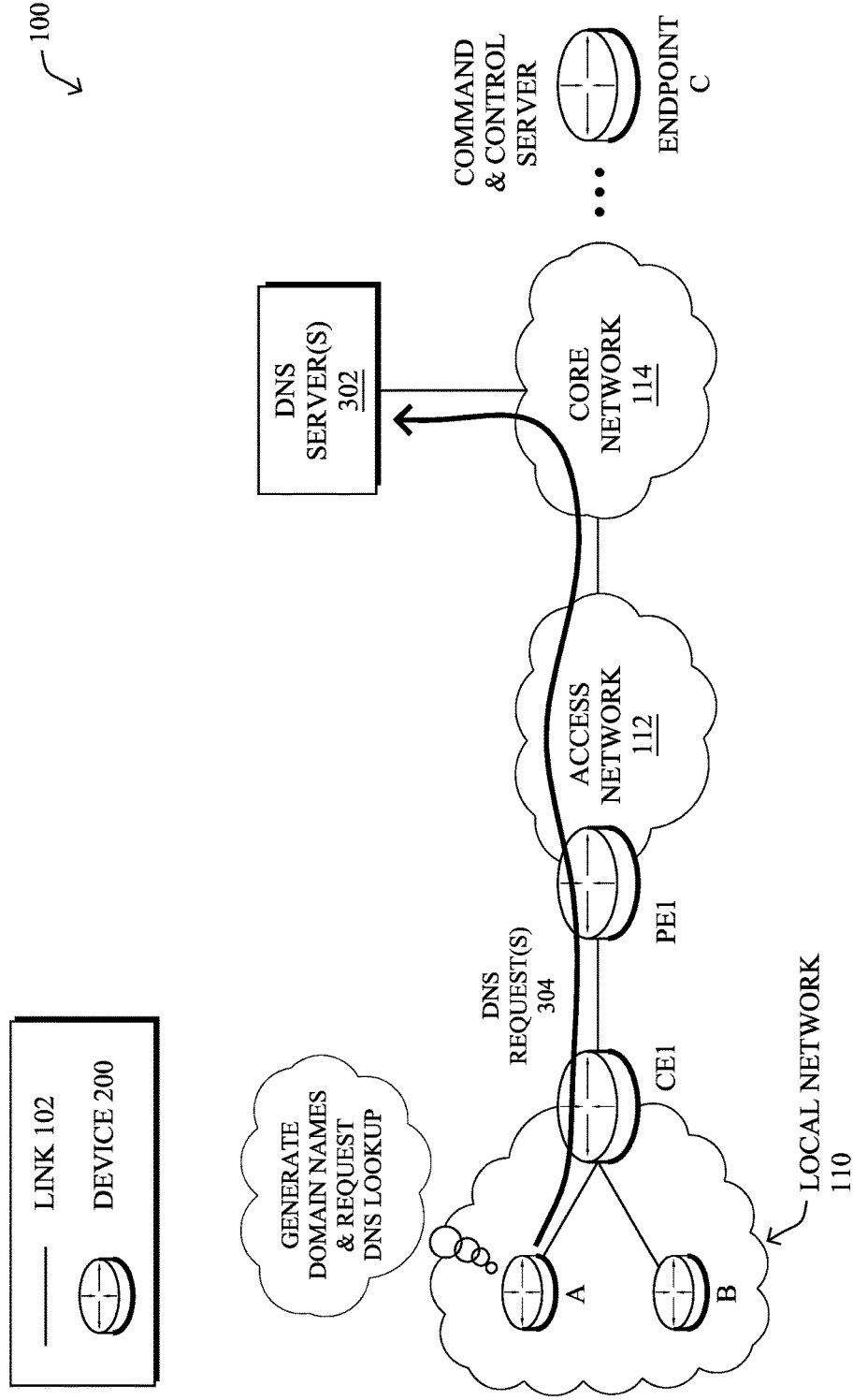
FIGS. 3A-3B illustrate an example of a domain name system (DNS) lookup.
Figure 3B:
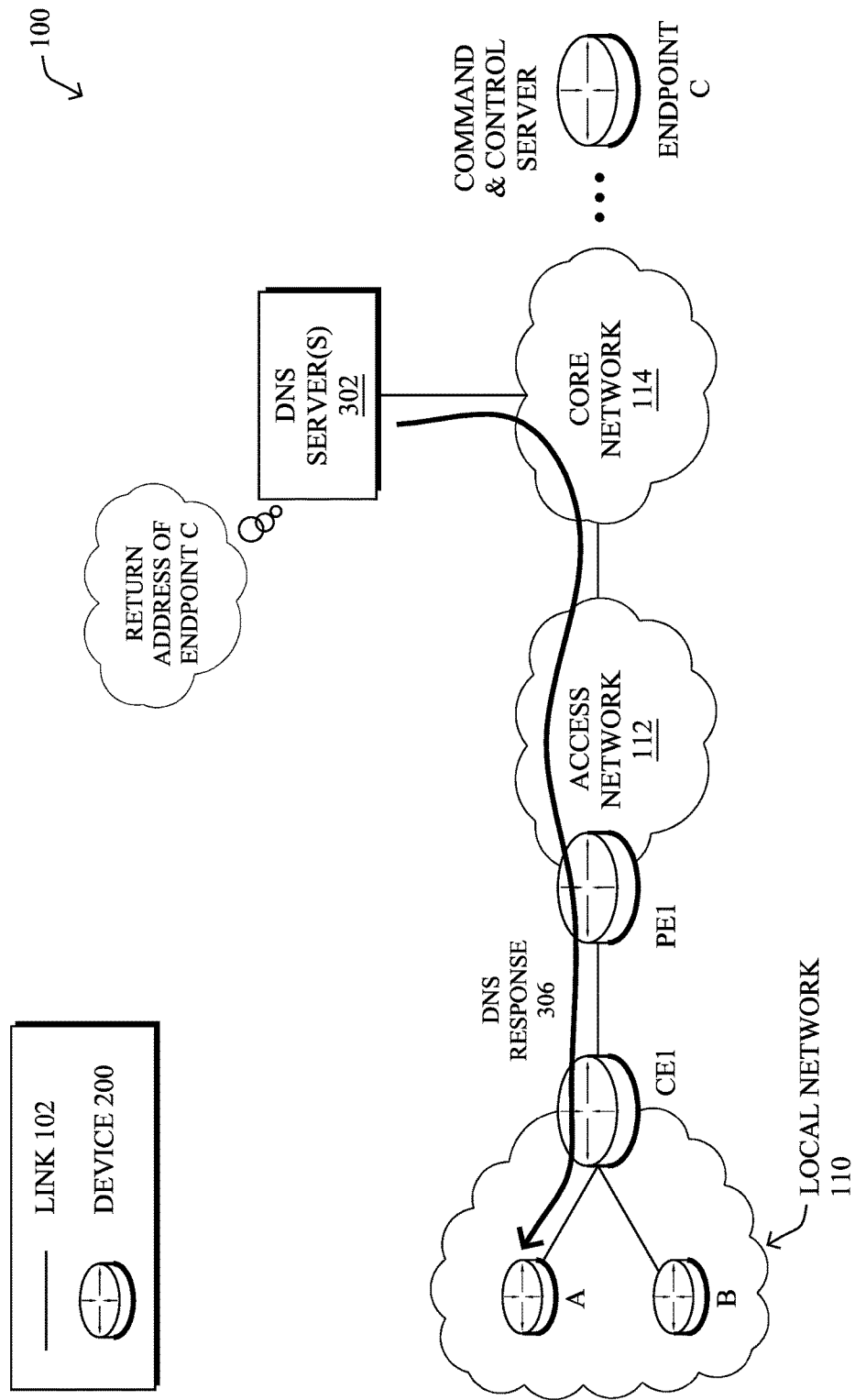

FIGS. 3A-3B illustrate an example of a domain name system (DNS) lookup. As shown, assume that client device A has been infected with malware that uses a DGA to communicate with a corresponding C&C server, endpoint device C shown. During operation, both infected client device A and endpoint C may execute a DGA to generate a corresponding set of domain names. In turn, endpoint C or the entity associated therewith may register one or more of the generated domain names with a DNS service (e.g., to associate the IP address of endpoint C with a generated domain name). Infected client device A may then send one or more DNS requests 304 to a DNS service provided by DNS server(s) 302, to look up the IP address associated with one or more of the generated domain names. This allows the C&C server to constantly switch IP addresses to avoid blocking mechanism and still retain control over the infected client devices.

To further avoid detection, the number of domain names generated by a DGA during any given time, the number of domain names registered to the C&C server during any given time, and/or the number of domain names queried by an infected client device may be variable. For example, if the DGA generates 100,000 domain names per day, the C&C server registers only one domain name per day, and an infected client queries 1,000 domain names per day, this gives the client a 1% chance of making contact with the C&C server during any given day. As shown in FIG. 3B, assume that the address of server C is registered to one of the DGA-generated domain names included in DNS request(s) 304. In such a case, DNS server 302 may include the address of server C in a DNS response 306 sent back to infected client device A. With this address, client device A is now able to make direct contact with the C&C server, endpoint C, to receive further commands for its installed malware.

Feature-Based Classification of Individual Domain Queries

The techniques herein allow for the identification of the family of DGAs most likely to have generated a particular domain name. In some aspects, the techniques may leverage forests of two types of decision trees: one set of trees that assess the lexical features of the domain name itself and another set of trees that assess the cluster of related domains to which the domain name belongs. In this way, the techniques can combine local domain information and IP session activity together, to predict the family of DGAs that generated the domain name. Such information can be used, for example, to cause the performance of any number of security actions (e.g., by notifying an administrator that a given client is potentially infected with a certain class of malware, etc.).

Illustratively, the techniques described herein may be performed by hardware, software, and/or firmware, such as in accordance with process 248, which may contain computer executable instructions executed by the processor 220

(or by an independent processor of network interfaces 210), to perform functions relating to the techniques described herein.

Specifically, according to various embodiments, a device in a network determines a first set of domain generation algorithm (DGA) predictions for a particular domain name by analyzing one or more extracted lexical features of the particular domain name using a first ensemble of decision trees. The device determines a second set of DGA predictions for the particular domain name by analyzing one or more extracted cluster features of a cluster of related domain names to which the particular domain name belongs using a second ensemble of decision trees. The device predicts a DGA associated with the particular domain name based on the first and second sets of DGA predictions. The device causes performance of a security action based on the predicted DGA associated with the particular domain.

Figure 4:
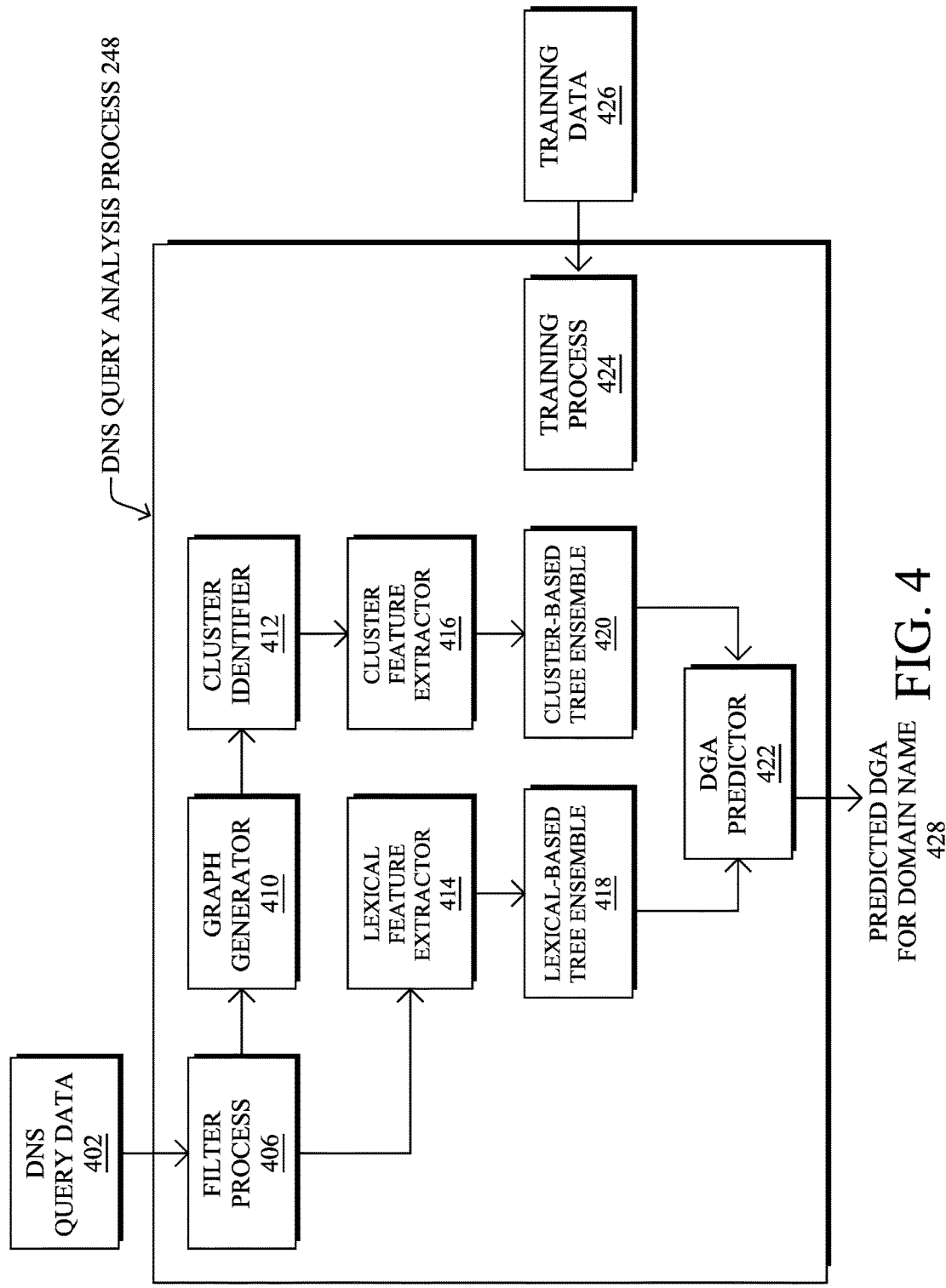
FIG. 4 illustrates an example architecture for analyzing DNS queries.

Operationally, FIG. 4 illustrates an example architecture for analyzing DNS queries, according to various embodiments. As shown, DNS query analysis process 248 may comprise any number of sub-processes, to predict the DGA associated with a given domain name. As would be appreciated, sub-processes 406-422 of query analysis process 248 may be implemented on the same device or, alternatively, as part of a distributed architecture across multiple executing devices.

During execution, DNS query analysis process 248 may receive DNS query data 402 as input. In some embodiments, query data 402 may comprise actual DNS queries if, for example, process 248 is executed by a device involved in the DNS query mechanism (e.g., a DNS server, a router, etc.). In further embodiments, DNS query data 302 may comprise features extracted from such DNS queries. For example, DNS query data 402 may include, but not limited to, identification information for the client device that sent a DNS query (e.g., the address of the device, etc.), the queried domain name, timestamp information indicative of when the DNS query was sent, DNS response information (e.g., the address associated with the queried domain name etc.), combinations thereof, or the like.

In some embodiments, DNS query analysis process 248 may include a filter process 406. In general, filter process 408 may be configured to filter out domain names from DNS query data 402 that are unlikely to have been generated by a DGA. For example, in view of the pseudorandom nature of DGA-generated domain names, filter process 408 may filter out DNS query data 402 for domain names that include actual words (e.g., using a stored dictionary). In further cases, filter process 406 may apply other filters to DNS query data 402, such as a white list of known and trusted domain names. Filter process 406 may further apply one or more time constraints to DNS query data 402 (e.g., by comparing the timestamp information of DNS query data 402 to one or more time thresholds), to construct a cohort for a domain name within a given time window.

DNS query analysis process 248 may also include a graph generator 410 configured to construct a graph data structure based on DNS query data 402 (e.g., as filtered by filter process 406). As described in greater detail below, graph generator 410 may construct a graph using the cohort whereby the pairs of client identifiers (e.g., client IP addresses) and corresponding domain names from the DNS queries define edges in the graph. Thus, vertices of the graph may represent either client devices or domain names. As a result, certain domain names may be related to one another by virtue of belonging to the same cluster of the graph (e.g., connected to one another in some way according to the graph).

In various embodiments, DNS query analysis process 248 may further include sub-processes that assess the lexical and/or cluster-based features of a domain name under scrutiny. For example, lexical feature extractor 414 may extract any number of lexical features from a domain name in DNS query data 402 (e.g., after filtering by filter process 406). In turn, lexical feature extractor 414 may provide the extracted lexical features to lexical-based tree ensemble 418 that comprises an ensemble of decision trees trained on lexical features extracted from various domain names.

Similarly, cluster identifier 412 may identify the cluster to which a domain name under scrutiny belongs in the graph generated by graph generator 410 and cluster feature extractor 416 may extract out any number of features of that cluster. In turn, cluster feature extractor may provide the extracted features as input to cluster-based tree ensemble 420. Similar to lexical-based tree ensemble 418, cluster-based tree ensemble 420 may comprise an ensemble of any number of trained decision trees to predict the originating DGA of the domain name under scrutiny.

Example lexical features that lexical feature extractor 414 may extract from a domain name may include, but are not limited to, K-L (Kullback-Leibler) divergence of unigrams, K-L divergence of bigrams, Jaccard Index of bigrams, edit distance, the character entropy of the domain name, the perplexity of the domain name, the ratio of special characters to alpha numeric characters in the domain name, the ratio of digits to alphabetic characters in the domain name, the extracted top-level domain from the domain name, or the like.

Example cluster-based features that cluster feature extractor 416 may extract from the cluster to which the domain name belongs may include, but are not limited to, an entropy of top level domains in the cluster, an average, median, skew, or kurtosis of inter-arrival times in the cluster, an average length of top level domains in the cluster, an average of second level domains in the cluster, an average number of domains with a third level domain or more, an entropy of alphanumeric characters in any of the domains in the cluster (e.g., second level bagged domains, etc.), a rank based on categories associated with the domain names (e.g., a measure of relationship to an online service or application type, such as email, etc.), combinations thereof, or the like.

DNS query analysis process 248 may further include a DGA predictor 422 that analyzes the predicted DGAs from tree ensembles 418-420 to determine a final predicted DGA 428 for the domain name under scrutiny. For example, DGA predictor 422 may selected the resulting DGA from tree ensembles 418-420 that has the highest associated probability as the overall predicted DGA 428 for the domain name, the DGA that appears most in the predictions from ensembles 418-420 (e.g., a majority vote), or using other approaches to preset the optimal voting weight each tree contributes. In various embodiments, DNS query analysis process 248 may use the predicted DGA 248 to cause the occurrence of any number of security-related actions in the network. For example, if predicted DGA 428 is associated with a known class of malware, a security device may generate an alert for the affected client device (e.g., to a network administrator, the user of the client device, etc.). In another example, predicted DGA 428 may be used to block the queried domain name, whitelist or blacklist the queried domain name, or take any other security-related action.

In some embodiments, tree ensembles 418-420 may be trained by a training process 424 using training data 426. Generally, training data 426 may include the extracted lexical and/or cluster-based features of a training set of domain names, as well as any known DGAs associated with the training set of domain names. In turn, training process 424 may construct corresponding forests of decision trees that can predict the originating DGA of a particular domain name under scrutiny based on the extracted lexical and/or cluster-based features for the domain name.

Figures 5A, 5B:
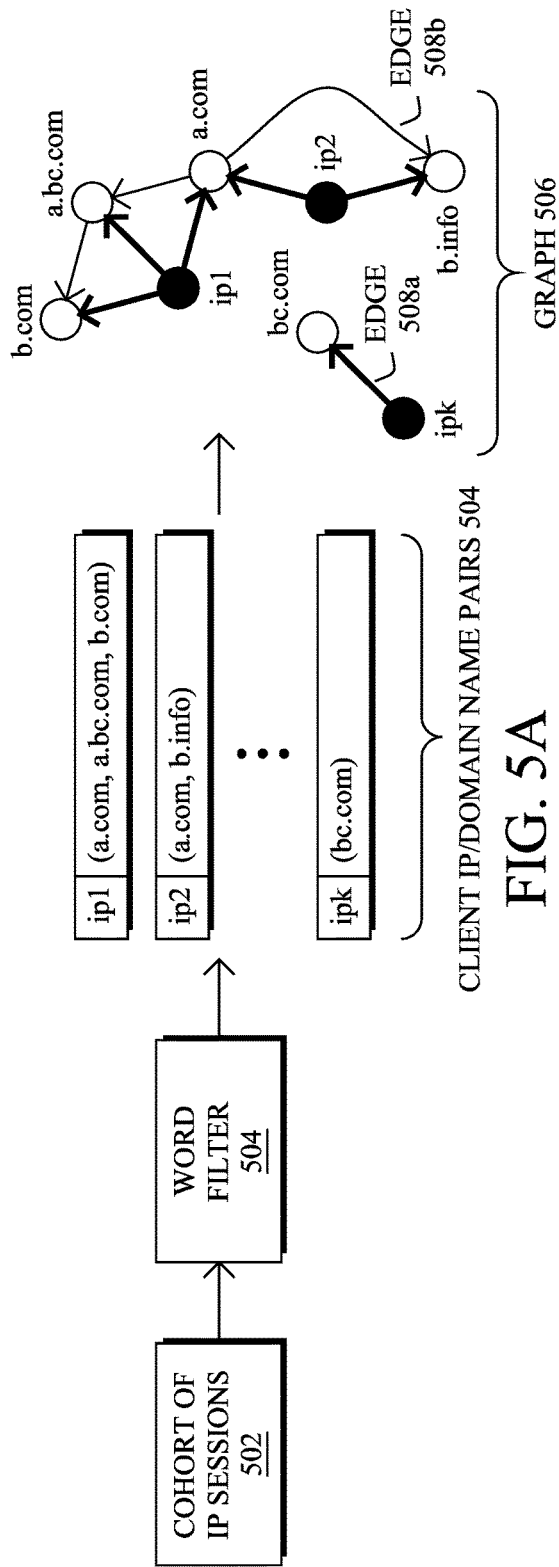
FIGS. 5A-5B illustrate examples of the formation of a domain name cluster.

FIGS. 5A-5B illustrate examples of the formation of a domain name cluster, according to various embodiments. As shown in FIG. 5A, process 248 may begin with a cohort 502 of IP sessions (e.g., DNS query data 402) and apply a word filter 504 to cohort 502 (e.g., using filter process 406). In turn, process 248 (e.g., using graph generator 410) may construct a set 504 of pairs of client IP address and queried domain names from the filtered DNS query data. For example, as shown, a first client device having IP address IP1 may have queried domain names {a.com, a.bc.com, and b.com} within a certain time window. Also during this time window, a second client device having IP address IP2 may have queries domain names {a.com, b.info}. As would be appreciated, set 504 may include any number of pairs, which may also be a function of the set time window for analysis. Finally, set 504 may include a $k^{th}$ pair for a kth client device having IP address IPk which queried domain name {b.com}.

Using set 504, the graph generator may construct a graph 506 with each vertex representing either a client IP address from set 504 or a unique domain name from set 504. Additionally, in various embodiments, the edges of graph 506 may represent the relationships between the client IP addresses and domain names and/or between different domain names themselves. For example, an edge 508a between the vertices representing IP address IPk and domain name bc.com may represent a DNS query sent by IPk for domain name bc.com. Similarly, the edges for the vertices representing IP1 and IP2 may correspond to the domain names queried by these addresses, {a.com, a.bc.com, and b.com} and {a.com, b.info}, respectively. Edges between domain name vertices may also represent a relationship between the domain names, such as being queried by the same client IP address. For example, edge 508b may represent that after querying domain name a.com, IP2 then performed a subsequent DNS query for domain name b.info. In some embodiments, the edges of graph 506 may also be weighted edges based on the inter-query times between the queries or the sum of the inter-query times for repeated edges. For example, edge 508b may be weighted based on the elapse times between the DNS queries IP2 issued for a.com and for b.info.

FIG. 5B illustrates an example cluster 510 from graph 506, according to various embodiments. Generally, a cluster refers to a sub-graph of inter-related domain names from the graph constructed from the DNS query data. More formally, a given cluster may comprise all of the nodes that are interconnected by a set of edges. For example, a first cluster in graph 506 shown in FIG. 5A may include the vertices for IPk and bc.com, as well as edge 508a that connects these two vertices. A second cluster, cluster 510, may also exist in graph 506 that comprises the connected vertices representing IP addresses IP1 and IP2, as well as domain names b.com, a.bc.com, a.com, and b.info. Notably, since IP1 and IP2 both issued DNS queries for a.com within a certain time period, domain names b.com, a.bc.com, a.com, and b.info may be considered related according to cluster 510. However, as there is no edge connection between cluster 510 and the cluster comprising edge 508a, the DNS query from IPk for bc.com may be considered unrelated to the queries represented in cluster 510. A variety of approaches can be used to determine the clusters, such as global approaches (e.g., using cuts, maximum flow, spectral methods, betweenness, voltage and potential, Markov chains, random walks, etc.) and local methods (e.g., greedy hill-climbing, simulated annealing, stochastic searches, etc.).

Figure 6:
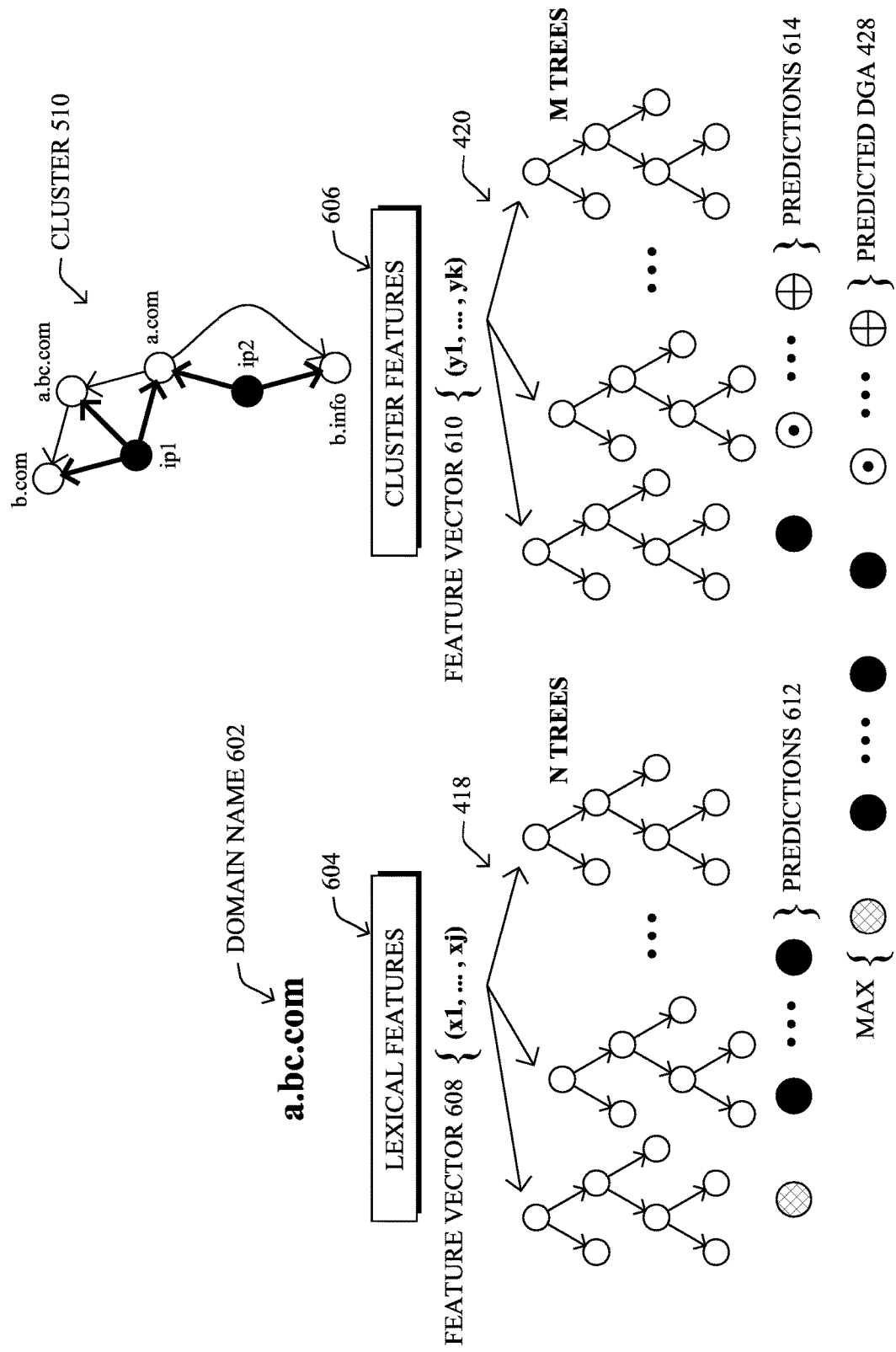
FIG. 6 illustrates an example of the prediction of a domain generation algorithm (DGA) associated with a domain name.

Continuing the examples of FIGS. 5A-5B, FIG. 6 illustrates an example of the prediction of a DGA associated with a particular domain name, according to various embodiments. As shown, assume that the particular domain name 602 (e.g., a.bc.com) is under analysis. From domain name 602, process 248 may extract any number of lexical features 604 from a.bc.com, such as the character entropy, ratio of digits to alphabetic characters, etc. In turn, a feature vector 608 can be constructed using the extracted lexical features 604 and used as input to ensemble 418 of n-number of decision trees. Each decision tree in ensemble 418 may be trained to make a prediction regarding the originating DGA of domain name 602 based on a training set of known lexical features and known DGAs. Accordingly, ensemble 418 may output n-number of predictions 612 (e.g., one prediction per decision tree) regarding the predicted DGA associated with domain name 602.

Also as shown, assume that domain name 602 is part of cluster 510. From cluster 510, any number of cluster features 606 can be extracted and included in a feature vector 610. For example, process 248 may extract out the entropy of the top level domains in cluster 510 (e.g., .com, .com, .com, and .info), the average of the inter-arrival times of the corresponding DNS queries for cluster 510, etc. for inclusion in feature vector 610. Then, similar to the analysis of feature vector 608 by ensemble 418, feature vector 610 may be analyzed by ensemble 420 of m-number of decision trees configured to predict the originating DGA given the extracted cluster-based features. In particular, ensemble 420 may be trained using a training set of known cluster-based features and DGAs and may output m-number of predictions 614 (e.g., one per decision tree of ensemble 420).

As a result of the analysis, there are now n+m predictions (e.g., the combination of predictions 612 and 614). To then arrive at a final predicted DGA 428, process 248 may assess these combined predictions. In some embodiments, process 248 may take a majority vote from the combination of predictions 612-614. Said differently, let $s_i$ be a tree trained to route a vector of lexical features in ensemble 418 and let $t_j$ represent a tree trained to route a vector of cluster features in ensemble 420. If s and t then represent the collection of $s_i$ and $t_j$ trees, respectively, the final predicted DGA 428 may be selected using a majority vote of the lexical feature vector x and cluster feature vector y as follows:

$$\text{Predicted DGA} = \arg\{\max\{s_i, t_j\} \in \{s, t\}\}\{s_i(x), t_j(y)\}\}$$

Thus, process 248 is capable of predicting two things given the two ensembles of trees. The first is, given a domain, process 248 can predict the DGA family using local information from the lexical features and supplementing this with cluster information. The second is, given a cluster, process 248 can predict the DGA family using the cluster information and supplementing this with the individual domain lexical characteristics.

Figure 7:
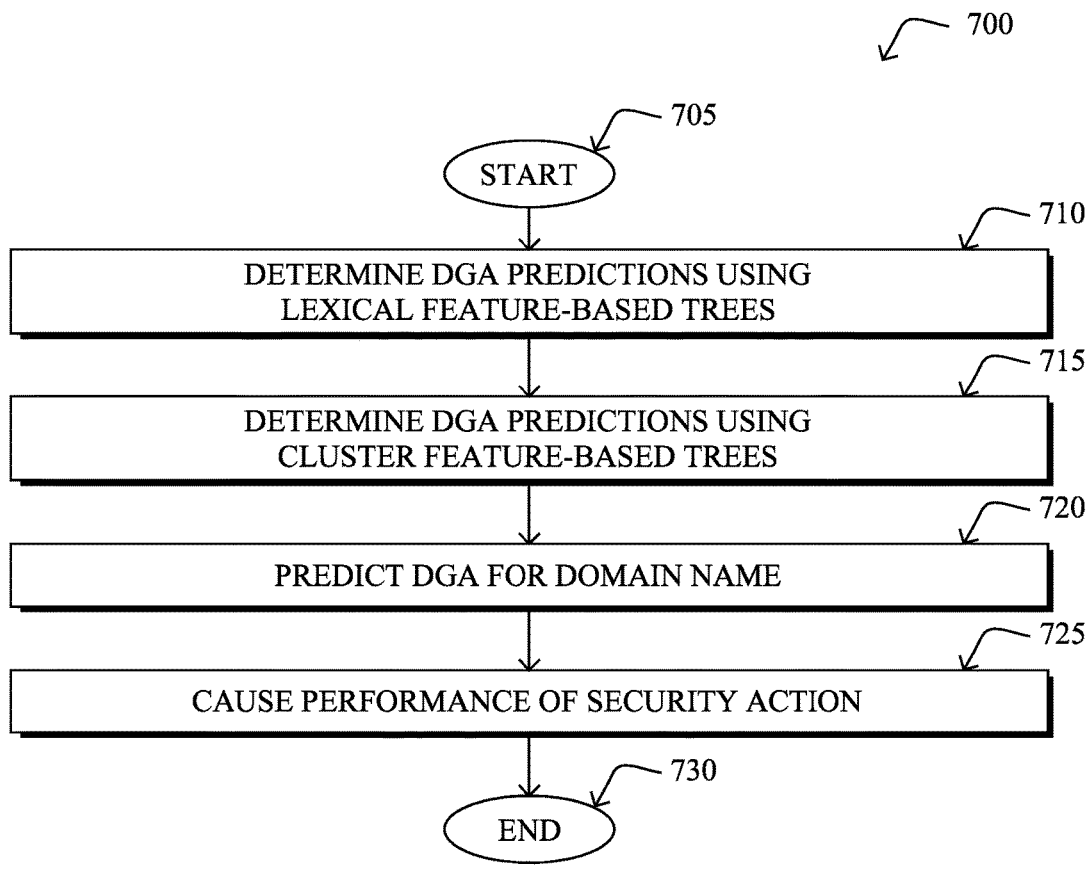
FIG. 7 illustrates an example simplified procedure for predicting a DGA associated with a domain name.

FIG. 7 illustrates an example simplified procedure for predicting a DGA associated with a domain name, in accordance with one or more embodiments described herein. For example, a non-generic, specifically configured device (e.g., device 200) may perform procedure 700 by executing stored instructions (e.g., process 248). Procedure 700 may start at step 705 and continue on to step 710 where, as described in greater detail above, the device may determine a first set of one or more DGA predictions using an ensemble of lexical feature-based decision trees. In particular, the ensemble of trees may generate the set of DGA predictions based on one or more lexical features extracted from a domain name under scrutiny such as a character entropy of the domain name, a perplexity of the domain name, a ratio of special characters to alphanumeric characters in the domain name, or a ratio of digits to alphabetic characters in the domain name.

At step 715, as detailed above, the device may also determine a second set of DGA predictions for the domain by analyzing one or more extracted cluster-based features of the domain name under scrutiny. In particular, the domain name may belong to a cluster of related domain names (e.g., based on the DNS queries for the domain names). In such a case, features extracted from the cluster to which the domain name under scrutiny belongs may be analyzed by a second ensemble of decision trees trained to predict a DGA in view of extracted cluster features, such as an entropy of top level domains in the cluster, an average of inter-arrival times for the cluster, an average length of n-level domains of the cluster, an entropy of alphanumeric domains of the cluster, or a rank based on one or more categorized services associated with the cluster.

At step 720, the device may predict a DGA for the particular domain name under scrutiny based on the sets of DGA predictions from steps 710-715, as described in greater detail above. For example, in some embodiments, the device may select the predicted DGA that appears most frequently among the sets of predictions as the final predicted DGA for the domain name under scrutiny. In further embodiments, the selection may also be based on other criteria, such as weighting mechanisms (e.g., to apply a greater weight to particularly malicious DGAs in the predictions, etc.).

At step 725, as detailed above, the device may cause the performance of a security action based on the predicted DGA for the domain name. Such a security action may include, but is not limited to, whitelisting the particular domain name, blacklisting the particular domain name, or generating an alert regarding the domain name. For example, if the predicted DGA is associated with a certain class of malware, the security action may entail sending an alert to a network administrator to inform him or her of the infected client. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the prediction of a DGA associated with a given domain name based on both its lexical features, as well as the features of the cluster of related domain names to which it belongs. By using an ensemble of decision trees, the techniques are scalable for limited memory utilization and permit each tree to be trained and stored on different machines, in some implementations. Finally, using decision trees reduces the amount of time needed to prepare and normalize the training features, in comparison to other assessment mechanisms such as support vector machines and linear models.

While there have been shown and described illustrative embodiments that provide for the feature-based classification of individual domain name queries, it is to be understood that various other adaptations and modifications may be made within the spirit and scope of the embodiments herein. For example, while certain embodiments are described herein with respect to using certain models for purposes of analyzing domain names, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
determining, by a device in a network, a first set of domain generation algorithm (DGA) predictions for a particular domain name by analyzing one or more extracted lexical features of the particular domain name using a first ensemble of decision trees;
determining, by the device, a second set of DGA predictions for the particular domain name by analyzing one or more extracted cluster features of a cluster of related domain names to which the particular domain name belongs using a second ensemble of decision trees;
forming, by the device, a graph based on domain name system (DNS) queries, wherein vertices of the graph represent client nodes and domain names associated with the DNS queries, and wherein a particular edge of the graph represents a particular DNS query from one of the client nodes for the particular domain name;
predicting, by the device, a DGA associated with the particular domain name based on the first and second sets of DGA predictions; and
causing, by the device, performance of a security action based on the predicted DGA associated with the particular domain name.

2. The method as in claim 1, wherein the security action comprises one of: whitelisting the particular domain name, blacklisting the particular domain name, or generating an alert regarding the domain name.

3. The method as in claim 1, wherein the one or more extracted lexical features comprise one or more of: a character entropy of the particular domain name, a perplexity of the particular domain name, a ratio of special characters to alphanumeric characters in the particular domain name, or a ratio of digits to alphabetic characters in the particular domain name.

4. The method as in claim 1, wherein the one or more cluster features extracted from the cluster to which the particular domain name belongs comprise one or more of: an entropy of top level domains in the cluster, an average of inter-arrival times for the cluster, an average length of n-level domains of the cluster, an entropy of alphanumeric domains of the cluster, or a rank based on one or more categorized services associated with the cluster.

5. The method as in claim 1, wherein the domain names in the cluster of related domain names are related based on a set of one or more client nodes that sent domain name system (DNS) queries for the domain names in the cluster.

6. The method as in claim 1, wherein the cluster of related domain names to which the particular domain name belongs comprises a subset of vertices of the graph and at least the particular edge of the graph.

7. The method as in claim 1, further comprising:
performing, by the device, a word filter on the DNS queries, prior to forming the graph.

8. The method as in claim 1, further comprising:
training, by the device, the first ensemble of decision trees using a training set of domain names and DGA labels.

9. The method as in claim 1, further comprising:
training, by the device, the second ensemble of decision trees using one or more training clusters of related domain names and DGA labels.

10. An apparatus, comprising:
one or more network interfaces to communicate with a network;
a processor coupled to the network interfaces and configured to execute one or more processes; and
a memory configured to store a process executable by the processor, the process when executed operable to:
determine a first set of domain generation algorithm (DGA) predictions for a particular domain name by analyzing one or more extracted lexical features of the particular domain name using a first ensemble of decision trees;
determine a second set of DGA predictions for the particular domain name by analyzing one or more extracted cluster features of a cluster of related domain names to which the particular domain name belongs using a second ensemble of decision trees;
form a graph based on domain name system (DNS) queries, wherein vertices of the graph represent client nodes and domain names associated with the DNS queries, and wherein a particular edge of the graph represents a particular DNS query from one of the client nodes for the particular domain name;
predict a DGA associated with the particular domain name based on the first and second sets of DGA predictions; and
cause performance of a security action based on the predicted DGA associated with the particular domain name.

11. The apparatus as in claim 10, wherein the one or more extracted lexical features comprise one or more of: a character entropy of the particular domain name, a perplexity of the particular domain name, a ratio of special characters to alphanumeric characters in the particular domain name, or a ratio of digits to alphabetic characters in the particular domain name.

12. The apparatus as in claim 10, wherein the one or more cluster features extracted from the cluster to which the particular domain name belongs comprise one or more of: an entropy of top level domains in the cluster, an average of inter-arrival times for the cluster, an average length of n-level domains of the cluster, an entropy of alphanumeric domains of the cluster, or a rank based on one or more categorized services associated with the cluster.

13. The apparatus as in claim 10, wherein the domain names in the cluster of related domain names are related based on a set of one or more client nodes that sent domain name system (DNS) queries for the domain names in the cluster.

14. The apparatus as in claim 10, wherein the cluster of related domain names to which the particular domain name belongs comprises a subset of vertices of the graph and at least the particular edge of the graph.

15. The method as in claim 10, wherein the process when executed is further operable to:
perform a word filter on the DNS queries, prior to forming the graph.

16. The apparatus as in claim 10, wherein the process when executed is further operable to:
train the first ensemble of decision trees using a training set of domain names and DGA labels; and
train the second ensemble of decision trees using one or more training clusters of related domain names and DGA labels.

17. The tangible, non-transitory, computer-readable media as in claim 10, wherein the process when executed is further operable to:
train the first ensemble of decision trees using a training set of domain names and DGA labels; and
train the second ensemble of decision trees using one or more training clusters of related domain names and DGA labels.

18. A tangible, non-transitory, computer-readable media having software encoded thereon, the software when executed by a device in a network operable to:
determine a first set of domain generation algorithm (DGA) predictions for a particular domain name by analyzing one or more extracted lexical features of the particular domain name using a first ensemble of decision trees;
determine a second set of DGA predictions for the particular domain name by analyzing one or more extracted cluster features of a cluster of related domain names to which the particular domain name belongs using a second ensemble of decision trees;
form a graph based on domain name system (DNS) queries, wherein vertices of the graph represent client nodes and domain names associated with the DNS queries, and wherein a particular edge of the graph represents a particular DNS query from one of the client nodes for the particular domain name;
predict a DGA associated with the particular domain name based on the first and second sets of DGA predictions; and
cause performance of a security action based on the predicted DGA associated with the particular domain name.

19. The tangible, non-transitory, computer-readable media as in claim 18, wherein the cluster of related domain names to which the particular domain name belongs comprises a subset of vertices of the graph and at least the particular edge of the graph.

20. The tangible, non-transitory, computer-readable media as in claim 18, wherein the process when executed is further operable to:
perform a word filter on the DNS queries, prior to forming the graph.

* * * * *